United States Patent [19]

Sugino

[11] Patent Number: 5,149,215
[45] Date of Patent: Sep. 22, 1992

[54] CARRIAGE POSITION ERROR DETECTION IN A SERIAL PRINTER

[75] Inventor: Koichi Sugino, Tokyo, Japan

[73] Assignee: Seikosha Co., Ltd., Tokyo, Japan

[21] Appl. No.: 458,010

[22] Filed: Dec. 28, 1989

[30] Foreign Application Priority Data

Dec. 29, 1988 [JP] Japan .................. 63-331203

[51] Int. Cl.⁵ .................................. B41J 19/30
[52] U.S. Cl. .................................. 400/279; 400/74
[58] Field of Search ............... 400/279, 50, 322, 903, 400/74

[56] References Cited

U.S. PATENT DOCUMENTS 4,628,239 12/1986 Everett .................................. 400/903

FOREIGN PATENT DOCUMENTS 3521081A 1/1986 Fed. Rep. of Germany ...... 364/200
57-207080 12/1982 Japan .................................. 400/322
145180 8/1984 Japan .................................. 400/322
236781 11/1985 Japan .................................. 400/322
41576 2/1986 Japan .................................. 400/50
2197105A 5/1988 United Kingdom ............... 400/322

Primary Examiner—David A. Wiecking
Assistant Examiner—Steven S. Kelley
Attorney, Agent, or Firm—Jordan and Hamburg

[57] ABSTRACT

A serial printer includes a carrier motor which moves a printing head; a signal generator for supplying an output signal to the carrier motor to control the carrier motor to drive the printing head; a microprocessor for controlling operation of the signal generator; a counter for counting movement of the printing head in response to the output signal from the signal generator; and a malfunction detector for detecting a malfunction when the value of the counter reaches a predetermined count and for resetting the microprocessor in response thereto.

11 Claims, 1 Drawing Sheet

7 Moving Direction Deciding Circuit

6 Malfunction Detector

CARRIAGE POSITION ERROR DETECTION IN A SERIAL PRINTER

BACKGROUND OF THE INVENTION

The present invention relates to a serial printer.

In the prior art, a serial printer using a microprocessor is equipped with a watchdog timer as a countermeasure against runaway of the microprocessor. This watchdog timer is programmed to be cleared at a certain frequency, when the microprocessor is in its normal operation, but not when the microprocessor runs away. When a predetermined value is reached, a malfunction is detected so that the microprocessor is reset.

The watchdog timer of the existing serial printer is cleared in response to a clearing instruction of the program when the microprocessor is in its normal operation. When the number of clearing instructions is small, the watchdog timer reaches the predetermined value even in the normal operation of the microprocessor. Then, this microprocessor may be reset. When the number of clearing instructions is large, on the contrary, the watchdog timer may be cleared so as not to reset the microprocessor even if the microprocessor runs away. Thus, it is difficult to time the generation of clearing instructions in the program. This difficulty makes it impossible to say that run-away of the microprocessor will be halted without fail.

SUMMARY OF THE INVENTION

The present invention has an object to provide a serial printer which is enabled to detect run-away of a microprocessor without fail by detecting the movement or position of the printing head.

According to the present invention, the above-specified problems are solved by a serial printer which comprises a signal generator controlled by a microprocessor for generating a carrier motor driving signal; a counter for counting the movement or position of a printing head in response to the output signal of the signal generator; and a malfunction detector for detecting a malfunction, when the value of the counter reaches a predetermined value, to reset the microprocessor.

DESCRIPTION OF THE PREFERRED EMBODIMENTS

The present invention will be described in the following description in connection with the embodiments thereof with reference to the accompanying drawings in the particular case where it is applied to a two-way printer.

Figure 1:
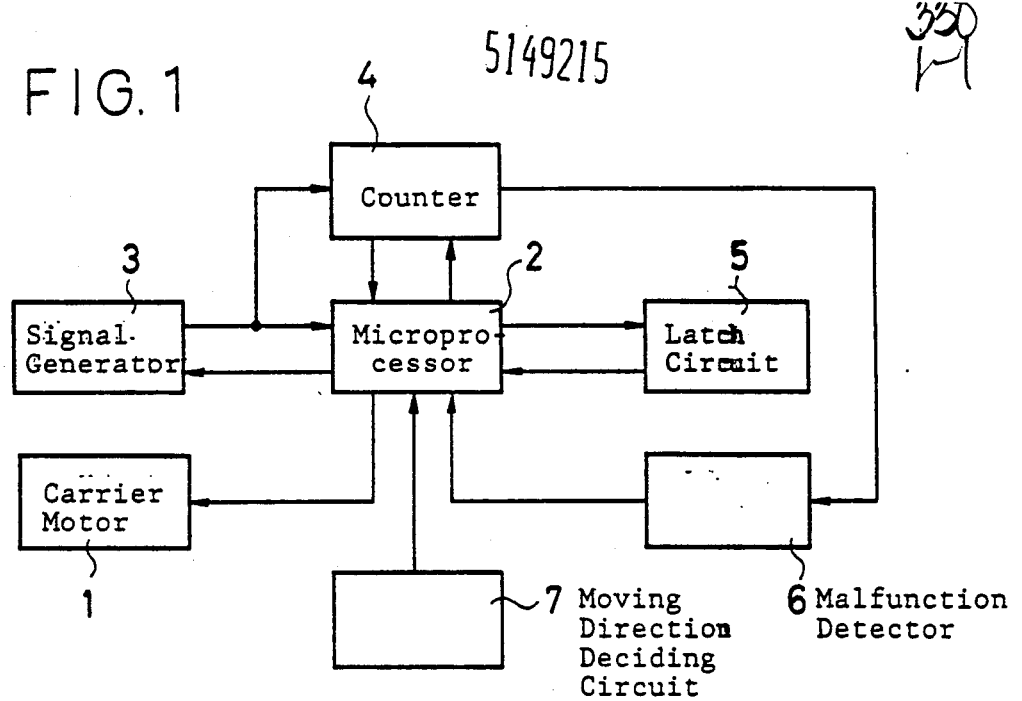
FIG. 1 is a block diagram showing one embodiment of the present invention.

Referring to FIG. 1, a printer according to one embodiment of the invention includes a carrier motor 1 for moving a printing head; a microprocessor 2 for a variety of controls; a signal generator 3 including a timer controlled by microprocessor 2 for generating a signal for driving carrier motor 1; and a counter 4 for counting the movement of the printing head in response to the output signal from signal generator 3. Counter 4 is cleared for each movement at one line of the printing head. A latch circuit 5 is provided for latching the value which is calculated by microprocessor 2 on the basis of the value of counter 4. A malfunction detector 6 is provided for detecting a malfunction, when the value of counter 4 reaches a predetermined value, to reset microprocessor 2. The printer further includes a moving direction deciding circuit 7 for deciding the moving direction of the printing head.

The operation of the first embodiment will now be described. When the power supply (not shown) is turned on, carrier motor 1 is driven by microprocessor 2 to move the printing head to a predetermined start position, e.g., the lefthand end of the recording paper, and counter 4 and latch circuit 5 are reset. Next, in response to the printing instruction, microprocessor 2 sets signal generator 3 with a predetermined timer value to start the count. When the set timer value is counted, signal generator 3 sends an output signal to counter 4 and microprocessor 2. In response to this output signal, counter 4 increments the accounted value, and microprocessor 2 drives carrier motor 1 to move the printing head rightward by one step. The operations thus far described are repeated to accomplish the rightward printing. When this printing operation is completed, counter 4 is caused by microprocessor 2 to have its value latched in latch circuit 5 and then its content cleared. In the present embodiment, the rightward movement of the printing head is set in the positive direction whereas the leftward movement is set in the negative direction. In accordance with these definitions, the moving direction of the printing head is decided by moving direction deciding circuit 7. When the rightward movement is ended by microprocessor 2 the value of counter 4 is added to the value latched in latch circuit 5, and this added result is newly latched in latch circuit 5. At the end of the leftward movement, on the other hand, the value of counter 4 is subtracted from the value of latch circuit 5. For example, in the case where the printing head is moved rightward by 500 steps and then leftward by 300 steps, microprocessor 2 calculates 500 − 300 = 200, which is latched in latch circuit 5. Thus, the position of the printing head is latched in latch circuit 5.

When microprocessor 2 runs away so that the value of counter 4 reaches a predetermined value, namely, when the movement of the printing head reaches a value exceeding the movement from the lefthand extremity to the righthand extremity, the malfunction is detected by malfunction detector 6 so that microprocessor 2 is reset.

Figure 2:
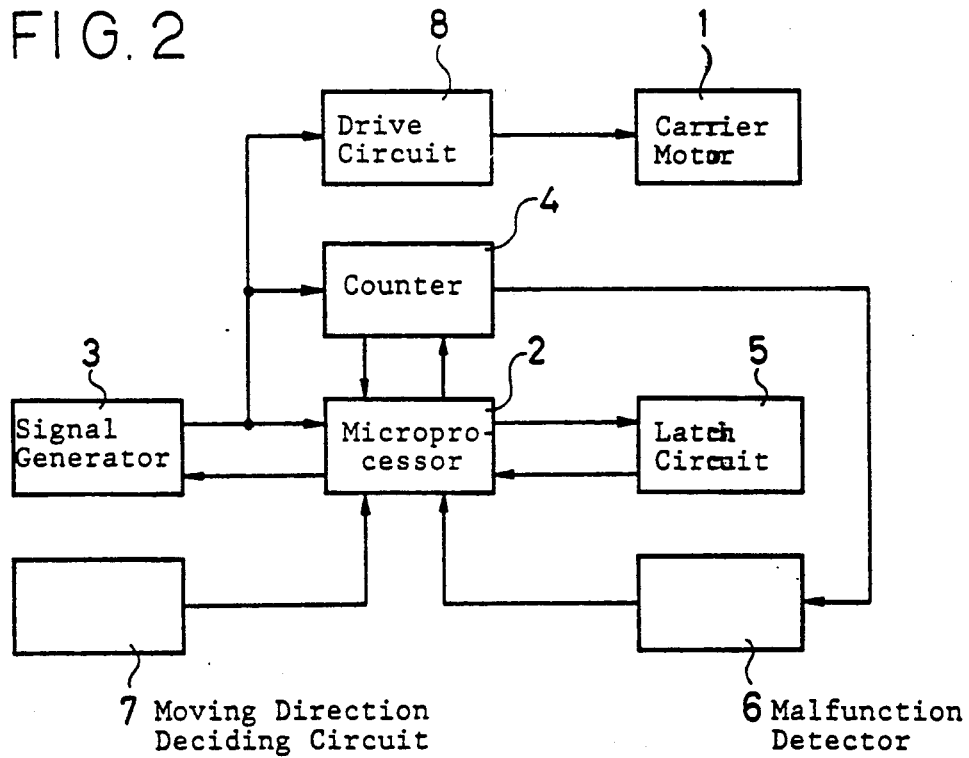
FIG. 2 is a block diagram showing another embodiment of the present invention.

FIG. 2 shows another embodiment of the present invention in which carrier motor 1 is moved step-by-step by a drive circuit 8 each time an ouput signal is sent from signal generator 3.

By the operations thus far described, the malfunction can be detected in terms of the movement of the printing head.

Despite this fact, however, the malfunction can also be detected in terms of the value of latch circuit 5.

The counter 4 may be an up-down counter for counting the position of the printing head so that the malfunction may be detected when the value of counter 4 exceeds a predetermined value.

According to the present invention, the difficulty in the timing for generating the clearing instruction in the program in the case of detecting runaway of the microprocessor by using the watchdog timer can be eliminated to detect runaway of the microprocessor more reliably.

I claim:

1. A serial printer comprising:
carrier motor means for driving a printing head;
means for generating a countable output signal;
means responsive to said output signal for driving said carrier motor means;
counter means for counting the output signal of said output signal generating means;
microprocessor means for controlling said signal generator means and counter means; and
malfunction detector means for detecting a malfunction responsive to the count in said counter means reaching a predetermined value, and for resetting said microprocessor means in response thereto.

2. A serial printer according to claim 1 further including latch means for latching the count of said counter in response to said microprocessor means and said counter means.

3. A serial printer according to claim 2, wherein said latch means is connected directly to said microprocessor means and indirectly to said counter means through said microprocessor means.

4. A serial printer according to claim 1 further including moving direction deciding means for determining the direction of movement of said printing head and for supplying a signal corresponding thereto to said microprocessor means.

5. A serial printer according to claim 1 further wherein said means responsive to said output signal for driving said carrier motor means includes drive circuit means for driving said carrier motor means in response to said signal generator means.

6. A serial printer according to claim 5, wherein said output signal generating means is connected to said carrier motor means through said drive circuit means.

7. A serial printer according to claim 1, wherein said output signal generating means is connected to said carrier motor means through said microprocessor means.

8. A serial printer according to claim 1, wherein said signal generator means, said counter means and said malfunction detector means are each connected directly to said microprocessor means.

9. The serial printer of claim 1 wherein said malfunction detector comprises means for detecting a count in said counter means that exceeds the count corresponding to the distance from the left margin to the right margin of said print head.

10. A serial printer comprising:
carrier motor means for driving a printing head; and
a control circuit including a microprocessor,
said control circuit comprising means for outputting a countable signal for controlling said carrier motor means to drive said printing head, means for counting said countable signal, and means responsive to a count in said counting means exceeding a predetermined value for resetting said microprocessor.

11. The serial printer of claim 10 wherein said predetermined value is a count exceeding a count corresponding to the maximum movement range of said printing head.

* * * * *